(12) United States Patent
Cooperman

(10) Patent No.: US 6,377,704 B1
(45) Date of Patent: Apr. 23, 2002

(54) METHOD FOR INSET DETECTION IN DOCUMENT LAYOUT ANALYSIS

(75) Inventor: Robert S. Cooperman, Somerville, MA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/070,288

(22) Filed: Apr. 30, 1998

(51) Int. Cl.[7] .................................................. G06K 9/34
(52) U.S. Cl. ....................... 382/176; 382/112; 707/521
(58) Field of Search ................................. 382/176, 175, 382/229, 112, 168, 321, 305, 180, 309, 317, 185, 173; 707/509, 530, 506, 517, 513, 500, 521; 358/462, 442, 443; 345/156, 841, 157, 175

(56) References Cited

U.S. PATENT DOCUMENTS

| 4,907,283 A | 3/1990 | Tanaka et al. ............... 382/229 |
| 5,159,667 A | 10/1992 | Borrey et al. ................ 707/500 |
| 5,197,122 A | 3/1993 | Miyoshi et al. .............. 707/530 |
| 5,235,654 A | 8/1993 | Anderson et al. ............ 382/180 |
| 5,363,480 A | 11/1994 | Usami et al. ................ 707/517 |
| 5,418,864 A | 5/1995 | Murdock et al. ............ 382/309 |
| 5,432,620 A | 7/1995 | Watanabe et al. ............ 358/462 |
| 5,436,639 A | 7/1995 | Arai et al. ................... 345/156 |
| 5,438,512 A | 8/1995 | Mantha et al. .............. 707/517 |
| 5,465,304 A | 11/1995 | Cullen et al. ................ 382/176 |
| 5,475,805 A | 12/1995 | Murata ........................ 707/513 |
| 5,485,566 A | 1/1996 | Rahgozar .................... 707/509 |
| 5,555,362 A | 9/1996 | Yamashita et al. .......... 707/517 |
| 5,631,984 A | 5/1997 | Graf et al. ................... 382/317 |
| 5,634,021 A | 5/1997 | Rosenberg et al. ......... 345/841 |
| 5,642,435 A | 6/1997 | Loris .......................... 382/229 |
| 5,668,891 A | 9/1997 | Fan et al. .................... 382/168 |
| 5,774,580 A * | 6/1998 | Saitoh ......................... 382/176 |
| 5,784,487 A * | 7/1998 | Cooperman ................. 382/175 |
| 5,907,631 A * | 5/1999 | Saitoh ......................... 382/176 |
| 6,175,844 B1 * | 1/2001 | Stolin ......................... 707/521 |

OTHER PUBLICATIONS

*International Conference on Document Analysis and Recognition*; Oct. 20–22, 1993, "Document Image Segmentation and Text Area Ordering", pp. 323–329.
Model Matching in Intelligent Document Understanding; Dr. Gary S.D. Farrow, Prof. Costas S. Xydeas; and Dr. John P. Oakley; Sep. 1995, pp. 293–296.
Knowledge–Based Derivation of Document Logical Structure; Debashish Niyagi and Sargur N. Srihari; Sep. 1995, pp. 472–475.
A Knowledge–Based Approach to the Layout Analysis; Floriana Esposito, Donato Malerba, and Giovanni Semeraro; Sep. 1995, pp. 466–471.
Classification and Functional Decomposition of Business Documents; Suzanne Liebowitz Taylor, Mark Lipshutz, and Roslyn Weidner Nilson; Sep. 1995, pp. 563–566.
A Trainable, Single–Pass Algorithm for Column Segmentation; Don Sylwester, and Sharad Seth; Sep. 1995, pp. 615–618.

* cited by examiner

*Primary Examiner*—Leo Boudreau
*Assistant Examiner*—Ishrat Sherali
(74) *Attorney, Agent, or Firm*—Duane C. Basch; Philip E. Blair

(57) ABSTRACT

The present invention is a method for detecting insets in the structure of a document page so as to further complement the document layout and textual information provided in an optical character recognition system. A system employing the present method preferably includes a document layout analysis system wherein the inset detection methodology is used to extend the capability of an associated character recognition package to more accurately recreate the document being processed.

25 Claims, 8 Drawing Sheets examples of insets.

This is a sample document. It shows

*This is a frame inset. There is a box around it. Notice how the sentences in each column flow around it. That is true of all the inset types considered in this invention. However a frame inset has a box drawn around it.* several examples of insets. This is a sample document. It shows several examples of insets. This is a sample similar to captions, in the way they are treated by the word processor, but the text in captions refer to a picture.

This is a sample document. It shows several examples of insets. This is a sample document. It shows several examples of insets. This is a flow are s text tl the insets areas outsic text. speci that a flow are s text tl the fl In simila in the treate proce Y  
⟶ X

FIG. 6

*This is a column inset. It looks like a regular column, but it is narrower than the others are.*

*It might be used to summarize aspects of the rest of the page, or to highlight some feature.*

Insets are specia of text that are outsi flow of text. Inset special areas of text t outside the flow o Insets are special a text that are outside t of text. Insets are areas of text that are the flow of text. Ins special areas of text t outside the flow of te Insets are simi captions, in the way tl treated by the processor, but the captions refer to a pic This is a document. It shows examples of insets. T sample document. It several examples of This is a sample doc It shows several ex of insets. This is a document. It shows examples of insets.

This is a document. It shows examples of insets. Tl sample document. It

METHOD FOR INSET DETECTION IN DOCUMENT LAYOUT ANALYSIS

CROSS REFERENCE

The following related application is hereby incorporated by reference for its teachings:

"A SYSTEM FOR DOCUMENT LAYOUT ANALYSIS," Robert S. Cooperman, application Ser. No. 08/652,766, filed May 23, 1996 U.S. Pat. No. 5,784,487 Patel, Jay.

METHOD FOR INSET DETECTION IN DOCUMENT LAYOUT ANALYSIS

This invention relates generally to the processing of information during a document layout analysis in an optical character recognition (OCR) system, and more particularly to a method for detecting insets in the structure of a document page so as to further complement the document layout and textual information provided in an optical character recognition system.

COPYRIGHT NOTIFICATION

A portion of the disclosure of this patent document contains material which is subject to copyright protection, Copyright© 1992–1997 Xerox Corporation. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is a system for providing information on the structure of a document page so as to complement the document layout and textual information provided in an optical character recognition system. As described by A. Rahgozar and R. Cooperman in application Ser. No. 08/585,142, filed Jan. 11, 1996 U.S. Pat. No. 5,841,900, it is known to employ OCR systems to divide or segment a digitized document based upon the boundaries of the text, graphic or pictorial regions therein. Document layout analysis is a process by which the information regarding the organization of the document content, i.e. its structure, is extracted from the document image. The structure identifies document entity types (e.g. paragraphs, figures and tables), their properties (e.g. the number of columns in a table), and their interrelations (e.g., a figure is above a caption). Although OCR is an inherent part of this process, it is not intended as an aspect of the present invention. Document layout analysis includes identifying the sections of a page, identifying regions of the document that represent captions to images or equivalent sections on a document page, the identification of column boundaries and techniques for employing such layout information to fit pages of differing sizes into a common document format. Indeed, such information is important to state-of-the-art OCR systems that attempt to produce textual output in "reading order" (e.g., appropriately reflecting the flow of text in columns, headers, footers, captions and now insets). It will be further appreciated that the methodology presented here is equivalently applicable to any of a number of document types so long as they may be represented as a digital image divided into segments or regions according to content.

Heretofore, a number of commercially available OCR products have disclosed techniques that make use of page segmentation, and then preserve only the size and location of the text regions. For example, a product marketed under the mark Omnipage™ outputs text regions as frames. Other OCR products are known to be limited to identification of a single section per page of a document. The typical system does not preserve section structure, and text flow. While, some systems may preserve sections under specific circumstances, for example, where the columns in a section did not overlap one another, none of the systems finds insets (regions not part of the text flow) within a document page.

In accordance with the present invention, there is provided a document layout analysis method for determining document structure data from input data including the content and characteristics of regions of at least one page forming the document, the method comprising the steps of: segmenting the regions within the page to identify regions characterized as text, graphics, and rulings; within the text regions, identifying those text regions representing headers footers and captions and for the remaining text regions analyzing text regions to identify and characterize certain text regions as insets; recomposing the text regions of the document; combining the text regions into columns; and determining boundaries of at least one column on the page.

In accordance with another aspect of the present invention, there is provided a document layout analysis method for determining document structure data from input data including the content and characteristics of regions of at least one page forming the document, the method comprising the steps of: receiving page data; segmenting the regions within the page to identify regions characterized as text, graphics, and rulings; within the text regions, identifying those text regions representing headers footers and captions and for the remaining text regions identifying those remaining text regions that are frame and credit insets; recomposing the text regions of the document; identifying, within the recomposed text, any center, column and stray insets; and recalculating the sections of the document so as to produce output data indicative of the reading order of text regions therein.

One aspect of the invention deals with a basic problem in optical character recognition systems—that of preserving detail of the input document and in particular the flow of text (reading order) within the document. In particular, the present system is directed to a layout analysis system including inset detection that can be used to extend the capability of an OCR package to more accurately recreate the document being processed. Such a system produces output data for a word processor or a reading assistance device by preserving the reading order of the document to facilitate editability and a close approximation of the original appearance of the document.

This aspect is further based on the discovery of a technique that alleviates the text flow problems of traditional OCR systems. The technique provides information to supplement that generated by OCR processes. The technique employs methods to identify and characterize insets that may be found in a document image.

The technique described above is advantageous because it can be adapted to provide or supplement document layout data for any document processed by a system employing the techniques. The techniques of the invention are advantageous because they extend the capability of an OCR system—providing the ability to closely approximate a document in a word processing or speech synthesis environment, and enabling editability and readability while preserving the document's original appearance.

BRIEF DESCRIPTION OF THE DRAWINGS

FIGS. 6, 7 and 8 are illustrations of various examples of the insets detected by the methods described herein.

Figure 1:
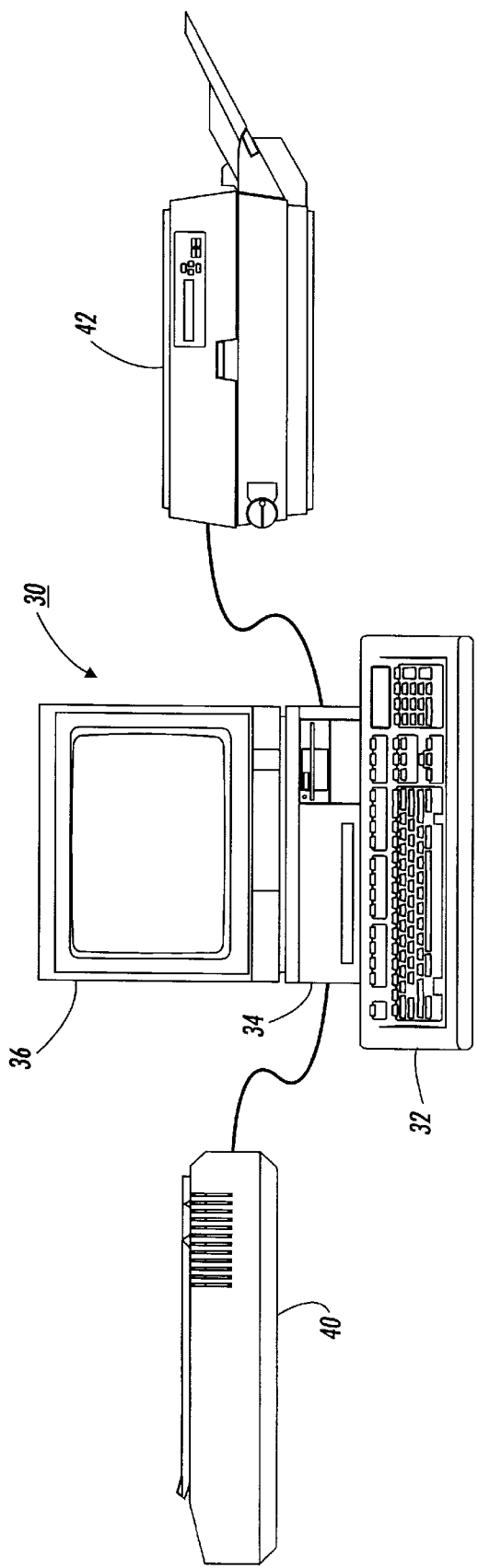
FIG. 1 is a general diagram of a personal computer or data processing system that provides an embodiment for various aspects of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values.

The term "data" includes data existing in any physical form, and includes data that are transitory or are being stored or transmitted. For example, data could exist as electromagnetic or other transmitted signals or as signals stored in electronic, magnetic, or other form.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

"Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

A "character type" is a category of which a character may be an instance, such as the letter "a" or the number "3".

A "character recognition system" is a system that can operate on an item of data defining characteristics of a character other than its character type to obtain an item of data indicating its character type.

A "word" is a set of one or more characters that is treated as a semantic unit in a language. "Text" is an arrangement of one or more lines of characters; the characters of a text may form words.

A "page" is a portion of a document, wherein the portion may be properly characterized as printed or printable information that may be rendered on a single sheet of the output medium. As used herein, the term "page" is not only applied to hard copy substrate sheets, but to corresponding electronic representations of such sheets. The electronic representations may be produced by one or more image input terminals, for example, a digital scanner. A "document" consists of one or more "pages."

A "region" is a portion of a page identified by a boundary be it visible or invisible. The boundary may have a regular rectangular shape or an irregular shape. The boundaries of two regions may overlap, meaning that the bounding boxes about regions may share common borders, but that the pixels within a bounding box are uniquely associated with a region defined by a bounding box. A "section" is a portion or region of a page that contains a particular number of columns, of particular widths and distances from the left margin. The flow of text does not continue from one section, to another, on the same page. For example, adding more text to a section will generally increase the height of that section in a word processor. This definition is believed to be consistent with the capabilities of certain word processors.

As used herein, "textual" regions of a page image are those regions containing alphanumeric or similar symbols, wherein the symbols form units of semantic understanding. Conversely, "non-text" or "picture" regions are those regions of a page image having little or no textual content, typically content that is pictorial or graphic in nature. Non-text regions include, for example, halftoned images, continuous tone images, tables, line drawings, clip-art.

A "table" as used herein is intended to refer to textual data arranged in a regular structure so as to generally have a plurality of rows and columns. A "caption" is a textual region associated with a non-text region such as a picture, wherein the text generally includes descriptive information associated with the picture. An "inset", as the term is used herein, is a region of text within a document that is not part of the flow of text for the larger region or section in which it appears (e.g., a sidebar), nor is it a header, footer or caption. Insets may be further classified by type including, for example, frame insets, credit insets, center insets, column insets and stray insets.

An "image input device" or "image input terminal" (IIT) is a device that can receive an image and provide an item of data defining a version of the image. A "scanner" is an image input device that receives an image by a scanning operation, such as by scanning a hard copy document.

An "image output device" of "image output terminal" (IOT) is a device that can receive an item of data defining an image and provide the image as output. A "display" is an image output device that provides the output image in human viewable form. The visible pattern presented by a display is a "displayed image" or simply "image."

Turning now to FIG. 1, the present invention finds particular use in image scanning systems that have the capability for optical character recognition. Although directed to aspects of an optical character recognition engine, a preferred embodiment for the present invention is a desktop data processing system having the capability for receiving digitized input. As shown in FIG. 1, such a system could include a computer workstation 30, including a keyboard 32, a system unit 34 and a display (monitor) 36. The workstation preferably includes a Windows™-compatible personal computer equipped with an Intel™ or compatible 80486 or Pentium™ microprocessor, a VGA, SVGA or Multisync color monitor, eight megabytes of RAM, eight to sixteen megabytes of permanent virtual memory, Microsoft Windows™ 95 or Windows NT operating system, and a minimum of nine megabytes free hard disk space. In addition, the data processing system preferably includes an image input terminal 40 for producing a digitized representation of a hard copy document. Alternatively, the digitized image source may be a disk or similar storage device for recording encoded image files, including fax-modem systems. Data processing system 30 may further include a printer 42 to render printed output of data produced, stored or otherwise made available via the data processing system. It will be appreciated by those skilled in the art that various aspects of data processing system 30 may be remotely located and that the functionality of such a system may be enabled via a network or similar communication links between various components of the system.

Figure 2:
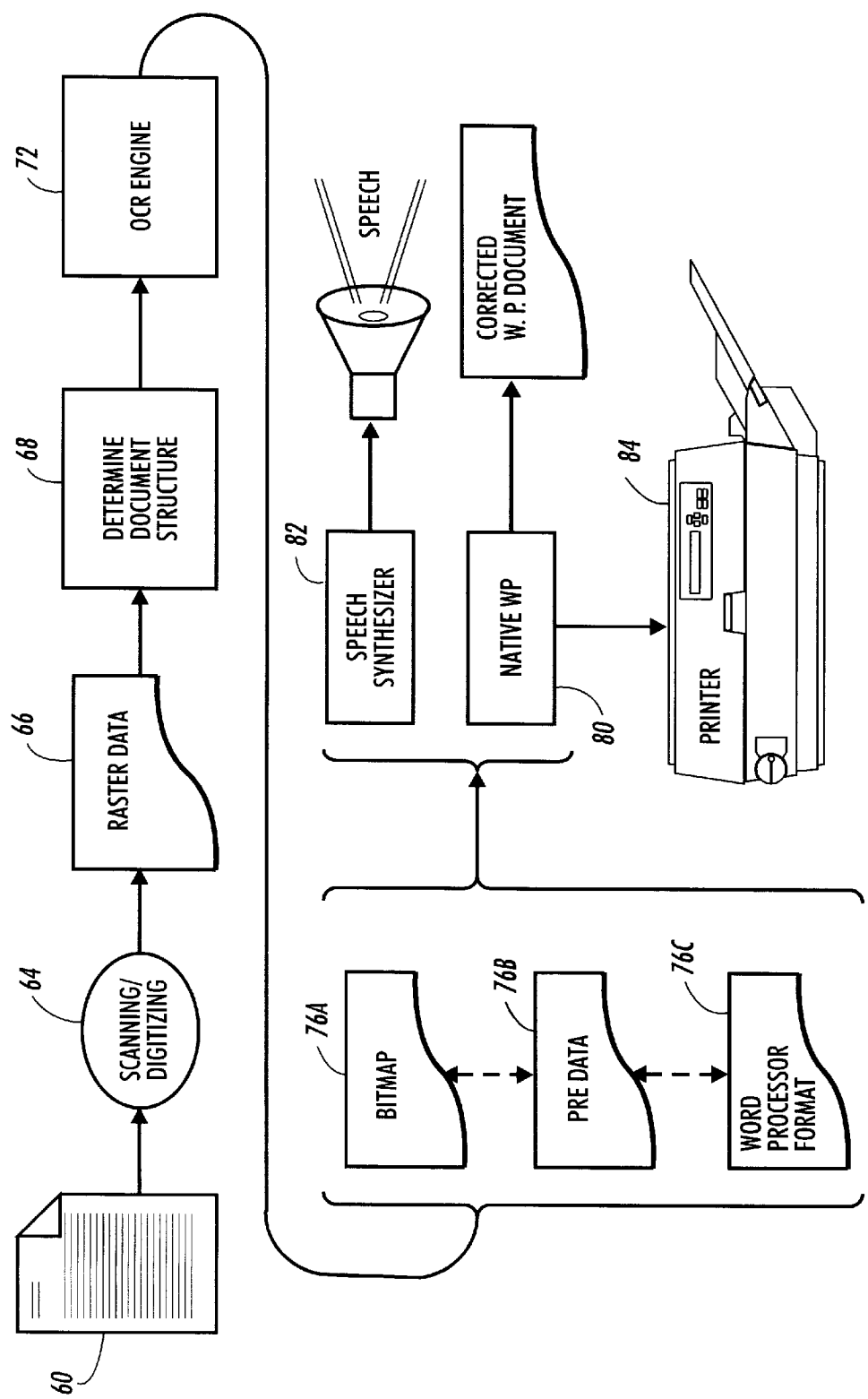
FIG. 2 is a data flow diagram depicting the flow of information in accordance with an aspect of the present invention.

Considering FIG. 2 in conjunction with FIG. 1, the general operation of an optical character recognition system will be described. It is to be understood that a preferred embodiment for the present invention is a computer workstation or data processing system similar to that illustrated in FIG. 1. Accordingly, various aspects of the present invention are implemented in software that controls the operation of a data processing system. FIG. 2 represents the data flow from a hard copy document 60 to a word processing document 62.

Initially, hard copy document 60 is placed or otherwise presented to image input terminal 40, where it is scanned or digitized as represented by operation 64 of FIG. 2. The output of the digitization process is rasterized data, reference numeral 66. The rasterized data is preferably in the form of an array of image data, for example a bitmap such as a Tag Image File Format (TIFF) formatted file or an equivalent graphics file format After digitization, the raster data 66 is passed first to a structure determination operation 68 and then to an optical character recognition (OCR) engine 72, where it is processed in accordance with OCR techniques described herein. In a preferred embodiment, the OCR engine is the engine found in the Xerox TextBridge® Pro 98 or TextBridge® Pro 3.03 OCR software. In general, the OCR engine operates to identify characters and characteristics for each of a plurality of words identified within the raster data. Output of the OCR engine comprises a number of files, including files 76a, 76b and 76c. File 76a preferably provides a means by which the document may be viewed on display 36 (FIG. 1) or in conjunction with a data searching tool. File 76c comprises data including descriptions of characters, fonts, and locations on the page and may be in a format readable by the native word processing system 80 or speech synthesizer 82.

The system described herein for document layout analysis uses information, produced by an OCR engine as inputs. In a preferred embodiment, the structure determination operation 68 would divide or segment each page into regions, each region preferably consisting essentially of elements of a common type or context (e.g., text or graphic/non-text (drawing, pictorial)). Further details of the manner in which such systems may segment a document page are described by Rahgozar et al. in U.S. patent application Ser. No. 08/585,142 or by Mahoney in U.S. patent application Ser. Nos. 08/563,479 and 08/565,181, filed Nov. 28, 1995, the relevant portions of which are hereby incorporated by reference. The resulting text regions can be as large as a column, or as small as a paragraph. The underlying requirement being that a correct reading order for a page, and likewise a determination of headers, footers, captions, and insets can be accomplished by arranging the text regions identified. Accordingly, in the input provided to the OCR recognition process, each non-text region should correspond to one graphic (picture) region. The document structure determination operation described herein may work adequately, even with some errors introduced by a page segmentation system.

For each region or segment identified within a particular page of the document, the following information is preferably provided by a segmentation system (not shown):

1) A description of each region as either text, graphic (e.g., picture, drawing, etc.), ruling, timestamp, or table cell;
2) The coordinates of the region's bounding box in absolute distance from either the scanned edge or the hard copy document's edge; and
3) For text regions, font information comprising: (a) the most common font, (b) the font size, (c) the font style (e.g., regular, bold, italic, fixed pitch, etc.), and (d) the number of lines of text within the region.

Figure 7:
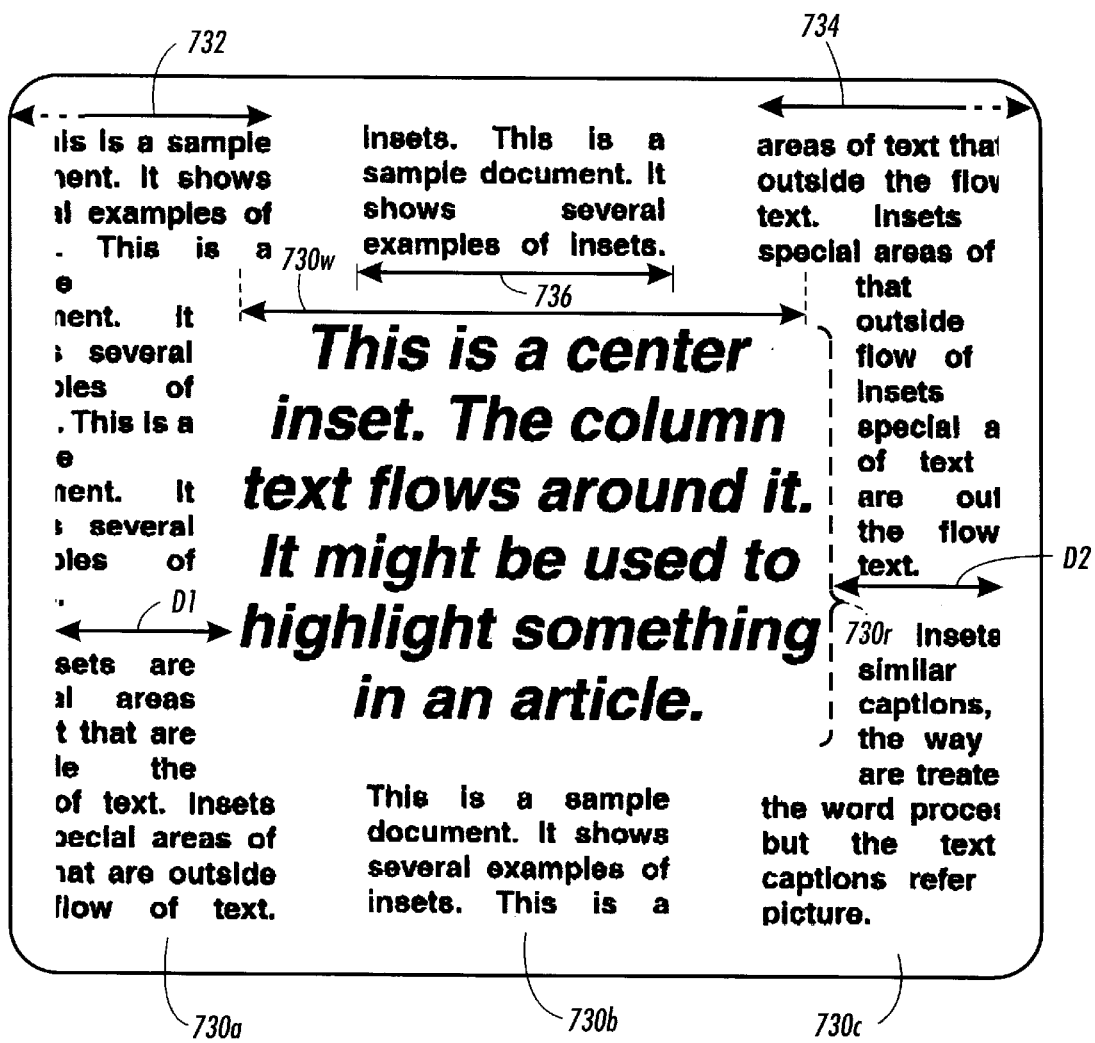

In response to the above inputs and in accordance with the present invention, a document layout analysis system with inset detection capability preferably provides the following outputs:

1) An identification of insets within the document;
2) A classification of the inset type (e.g., frame, credit, center, column or stray; examples of frame, center and column depicted in FIGS. 6–8);
3) The reading order of text regions;
4) A grouping of text regions into sections.

Having generally described the inputs and outputs of a document layout analysis system including inset detection capability in accordance with the present invention, attention is now turned to the operation of such a system.

Figure 3:
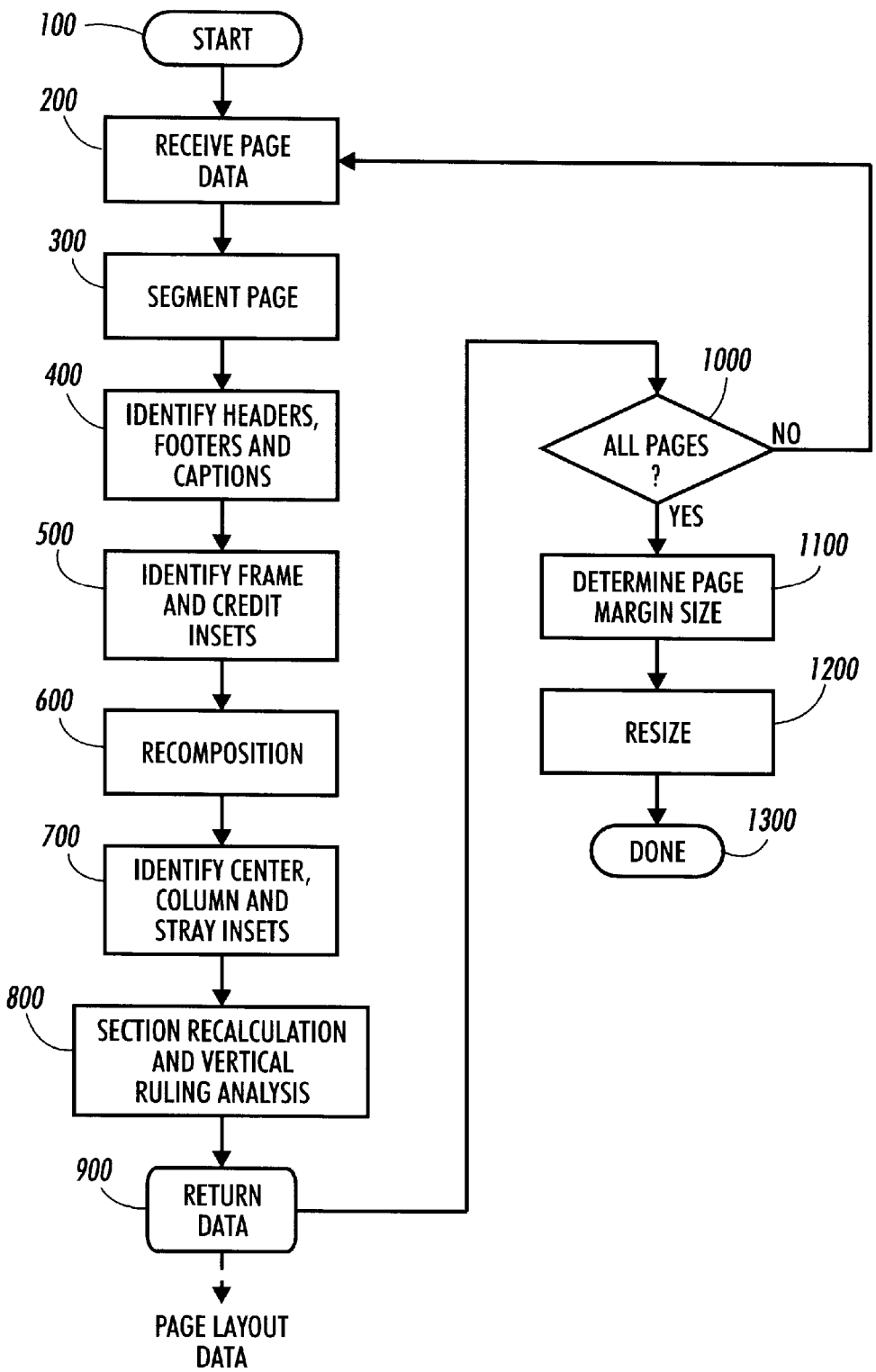
FIGS. 3–5 are flowcharts illustrating various aspects of the operation of the document analysis system in accordance with the present invention.

The overall program flow of the document layout analysis system is depicted beginning with FIG. 3. In particular, FIG. 3 is a flow chart generally illustrating various upper level steps executed to produce the output of the document layout analysis system—information sufficient to recreate a close approximation of an original document so that the information may be employed to produce a formatted file (e.g., word processor format 76c in FIG. 2) that is editable and bears a close approximation to the appearance of the original document.

Referring to FIG. 3, the process begins at step 100 where the document layout analysis system is invoked or otherwise started, preferably by a call to execute instructions as are generally described hereafter. At step 200, the document layout analysis system, operating on the data processing system characterized above, receives page data. Subsequently, at step 300, the page data is segmented by characterizing the text, graphics, and rulings regions of the image, before identifying headers, footers, and captions at step 400 as described in "A SYSTEM FOR DOCUMENT LAYOUT ANALYSIS," application Ser. No. 08/652,766, previously incorporated by reference. Step 500 identifies, within the segmented page, those segments corresponding to frame insets and credit insets as will be described in further detail.

Once the segments have undergone a primary categorization the document segments may be "recomposed" so as to place the segments into an appropriate output order, step 600. Again, the various details of the recomposition operation, including identification and merging of related segments can be found in application Ser. No. 08/652,766. Once the document page is recomposed, and the sections identified therein include information characterizing the sections and the segments making up the section, aspects of the present invention are again employed to identify center insets, column insets, and stray insets within the document page, step 700 described below.

After the final inset detection operation is completed, there is preferably some further processing (including recalculation of section information and vertical ruling analysis) in order to determine the output or reading order of the various segments within the sections, step 800. For example, if a section includes a picture and a caption, the output order will indicate where the caption is to be placed so that it appears in the same position when the page data is later accessed in a word-processing environment. At step 900, the data for a particular page is returned or otherwise temporarily stored in memory operatively connected to or inserted in a memory device that forms part of the data processing system.

Step 1000 tests to determine if all of a plural number of pages forming the document have been analyzed in accordance with steps 200–800 and the data stored as described in step 900. If not, processing continues at step 200 for subsequent pages of the document. Otherwise, processing continues at step 1100, where page margins are characterized based upon the individual page information previously obtained and stored. Once accomplished, various regions or pages within the document may be resized so as to provide a document with consistently appearing pages. It will be appreciated that the advantages arising from the resizing operation of step 1200 are wide ranging—allowing a user to avoid having to reformat, or more specifically resize, various features of the document within a word processing environment. Once the optional resizing operation is accomplished, the document layout analysis operations are completed and control is returned to the aspects of the system that invoked the document layout analysis, preferably to continue with OCR operations and further format analysis on the image data in accordance with the document layout information.

It will be appreciated by those skilled in the art of optical character recognition and digital image processing that the order of the above-described steps may be altered in accordance with the information required by the receiving operation. For example, the inset detection and recomposition steps, while being illustrated as occurring before OCR for certain product requirements, may also be run after the OCR operation is applied to image data that has simply been segmented. Moreover, the results achieved with the recomposition and inset detection operations may actually be slightly better if the operations followed an OCR operation.

Figure 4:
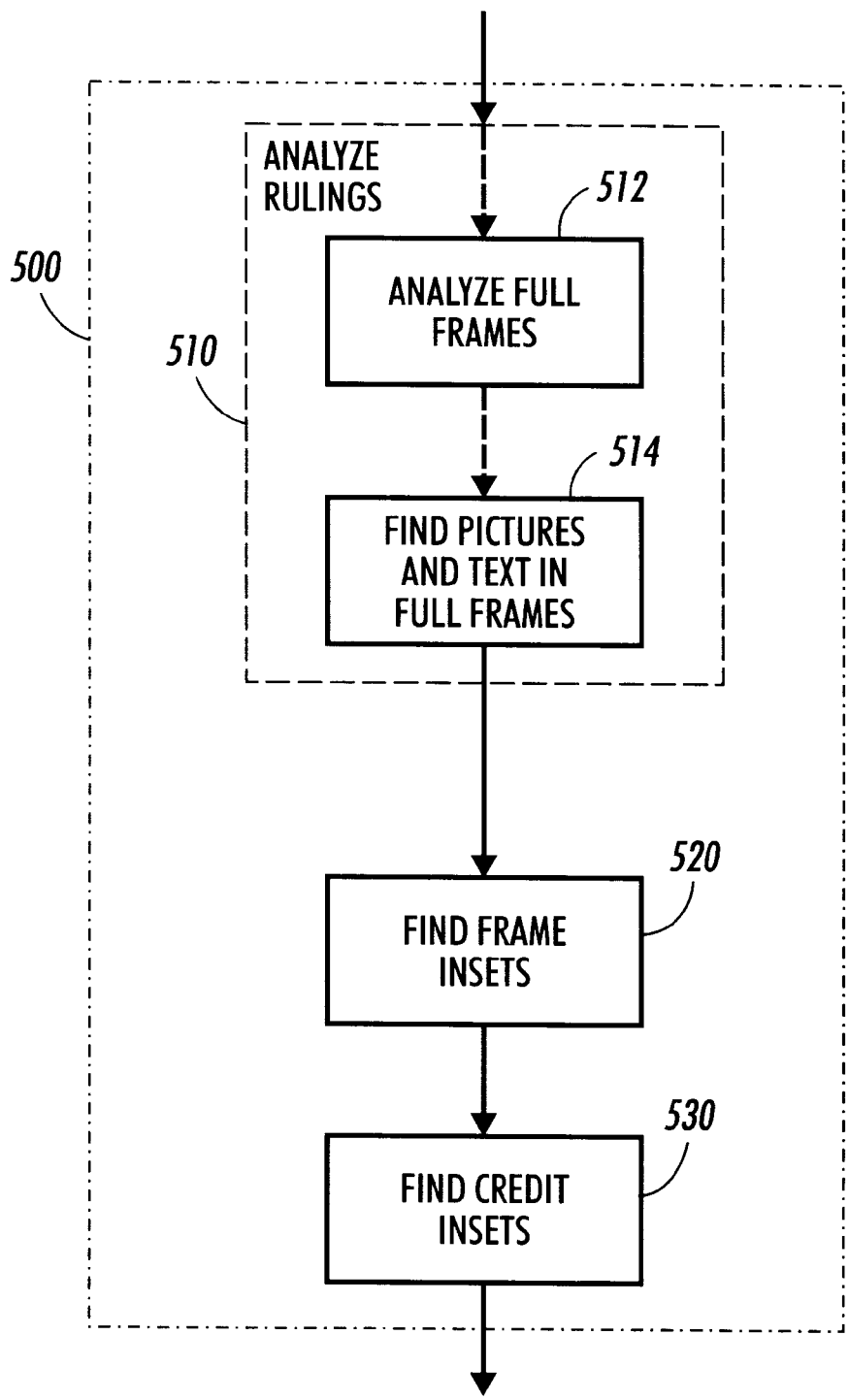

Having described the general operation of the document layout analysis system, attention is now turned to the following description, including representative source code, where further details of various inset detection operations (steps 500 and 700) are described in detail. Identification of frame and credit insets is accomplished in accordance with the steps depicted in FIG. 4. In particular, the process depicted in FIG. 4 starts by analyzing rulings within the image, step 510. The analyze ruling step further includes the subprocesses of analyzing full frames, step 512 and finding pictures and text in the full frames, step 514. After locating the pictures and text in the full frames, the frame insets are found, step 520, and then the credit insets are found, step 530.

The step of analyzing rulings (510) includes the operation of analyzing full frames. In particular, for each horizontal ruling within the frame, the following code is executed:

```
const RECOMP_UNITS MAX_FRAME_JOINT_GAP = 70;
const RECOMP_UNITS MIN_FRAME_HITE = 40;
BOOL LA::AnalyzeRestOfFullFrame (const LARgn * const pRgnTop,
                                  LAHRulingRgn * const pHRuleTop)
{
    INT32 RefNum2, RefNum3, RefNum4;
    LAHRulingRgn *pHRuleBot;
    LAVRulingRgn *pVRuleLeft, *pVRuleRight;
    RECOMP_UNITS fTop, fBot, fLeft, fRight;
    fRight = pRgnTop->GRight( );
    fLeft = pRgnTop->GLeft( );
    fTop = pRgnTop->GBot( );
    //for each HRule, find a right connecting lower vrule
    for (pVRuleRight = RgnsL.GFirstVRuling (RefNum2);
         pVRuleRight; pVRuleRight = RgnsL.GNextVRuling (RefNum2))
    {
        if ((ABS (pVRuleRight->GTOP( ) - fTop) < MAX_FRAME_JOINT_GAP)
            && (ABS (pVRuleRight->GRight( ) - fRight) < MAX_FRAMEJOINT_GAP))
        {
            //Right is reset to curr Vrule
            fRight = pVRuleRight->GRight( );
            fBot = pVRuleRight->GBot( );
            //find a connecting bot left hrule
            for (pHRuleBot = RgnsL.GFirstHRuling (RefNum3);
                 pHRuleBot; pHRuleBot = RgnsL.GNextHRuling (RefNum3))
            {
                if (((pHRuleBot->GTop( ) - fTop) >= MIN_FRAME_HITE)
                    && (ABS (pHRuleBot->GBot( ) - fBot) < MAX_FRAME_JOINT_GAP)
                    && (ABS (pHRuleBot->GRight( ) - fRight) < MAX_FRAME_JOINT_GAP))
                {
                    //Bot is reset to curr Vrule
                    fBot = pHRuleBot->GBot( );
                    fLeft = pHRuleBot->GLeft( );
```

-continued

```
            //find a connecting left top vrule
            for (pVRuleLeft = RgnsL.GFirstVRuling (RefNum4);
                    pVRuleLeft; pVRuleLeft = RgnsL.GNextVRuling (RefNum4))
            {
                if (((fRight - pVRuleLeft->GLeft( )) >= MIN_FRAME_HITE)
                    && (ABS (pVRuleLeft->GLeft( ) - fLeft)
                        <MAX_FRAME_JOINT_GAP)
                    && (ABS (pVRuleLeft->GTop( ) - fTop)
                        <MAX_FRAME_JOINT_GAP)
                    && (ABS (pVRuleLeft->GBot( ) - fBot)
                        <MAX_FRAME_JOINT_GAP))
                {
                    //Left is reset to curr Vrule
                    fLeft = pVRuleLeft->GLeft( );
                    MakeARuleFrame (fTop, fBot, fLeft, fRight,
                            pHRuleTop, pHRuleBot,
                            pVRuleLeft, pVRuleRight);
                    return TRUE;
                }
            }
            break;
        }
    }
    break;
    }
    }
    return FALSE;
}
```

The measurement unit called RECOMP_UNITS, is preferably on the order of 0.1 mm so, "const RECOMP_UNITS MAX_FRAME_JOINT_GAP=70;", refers to a distance of approximately 7 millimeters. Alternate units of, perhaps resolution based measurement (e.g., pixels or a relative scale based upon the original document size), may be employed as well for dimensions indicated herein. The preceding C++ function will call MakeARuleFrame, which makes Rule Frames (a list of the four rulings that make a frame), and the coordinates on the page of the resulting box.

Another specific type of box that is considered is a text region in reverse video (region where foreground brightness is brighter than background—requiring prior recognition of the reverse video region), with three rulings forming a box below the reverse video. In such cases, the box is assumed to have a top at the top of the area of reverse video background, and is otherwise treated as other boxes. Thus, for each text that is reverse video that also is not a header, footer, or caption: the same C++ function is called and if that function returns true, the text region is classified as a frame inset. The Rule frame extends to the top of that text frame.

Subsequent to completing the analysis of full frames, the step of finding pictures and text in full frames, step 514, is executed where for each frame earlier created MakeARuleFrame operation is carried out to determine which text regions are within a frame:

```
const RECOMP_UNITS WITHIN_FRAME_MARGIN = 30;
BOOL LAFrameRgn::WithinFrame (const RECOMP_UNITS iTop,
            const RECOMP_UNITS iLeft,
            const RECOMP_UNITS iBot,
            const RECOMP_UNITS iRight) const
{
    RECOMP_UNITS iXMid = (iLeft + iRight + 1) / 2;
    RECOMP_UNITS iYMid = (iTop + iBot + 1) / 2;
    if ((iTop >= (GTop( ) - WITHIN_FRAME_MARGIN))
        && (iLeft >= (GLeft( ) - WITHIN_FRAME_MARCIN))
        && (iBot <= (GBot( ) + WITHIN_FRAME_MARGIN))
        && (iRight <= (GRight( ) + WITHIN_FRAME_MARGIN))
        && (iXMid > GLeft( ))
```

-continued

```
        && (iXMid < GRight( ))
        && (iYMid > GTop( ))
        && (iYMid < GBot( )))
    {
        return TRUE;
    }
    else
    {
        return FALSE;
    }
}
``` where GLeft( ), GRight( ), GTop( ), GBot( ), get the coordinates of the frame. The input arguments, iTop, iLeft, iBot, iRight are the coordinates of the smallest box that encloses all the text in the region.

For each text region that is neither a header, footer, nor a caption the find frame insets operation, step 520, below is executed:

```
BestFrameSize = ARBITRARY_LARGE_RECOMP_UNIT;
pBestFrame = NIL;
for (pCurrFrame = RgnsL.GFirstFrame (RefNum2); pCurrFrame;
        pCurrFrame = RgnsL.GNextFrame (RefNum2))
{
    if (pCurrFrame->WithinFrame (pText))
    {
        if (pCurrFrame->GArea( ) < BestFrameSize)
        {
            pText->SetTextType (InsetRegion);
            pBestFrame = pCurrFrame;
            BestFrameSize = pCurrFrame->GArea( );
        }
    }
}
if (pBestFrame)
{
    pBestFrame->AddInsetWithin (pText->GRgnld( ));
}
```

The above code fragment finds the smallest possible frame for each eligible text region, and declares it to be an inset of that frame, using the AddInsetWithin function. Each frame now includes a list of any insets that are a part of it.

If the frame also contains a picture, the text might actually be a caption, and not an inset, but for the purposes of the present embodiment captions and insets are treated the same, and this distinction does not have to be made. It will be apppreciated that a caption can often be associated with a figure, and that the format of the caption may have different requirements than the format of an inset. A further description of the methods employed to find captions can be found in U.S. patent application Ser. No. 08/652,766.

There is one remaining condition that could cause the text within a frame to not be called an inset. In pseudo-code:

For each frame:
  For each text region initially considered an inset of that frame:
    For each other text region also initially considered an inset of that frame:
      if both the text regions are each wider than 19 mm and region A is to the side of region B,
      then no text regions in that frame are classified as Frame Insets.

where the state of "being to the side of", is determined using the following code:

```
const INT32 MAX_PERCENT_OFF_CENTER_SIDE = 30;
const RECOMP_UNITS VERT_OVRLAP_MARGIN = 35;
BOOL LA::bToSideOf (const LARgn *pRgnA, const LARgn *pRgnB)
{
    if ((pRgnA->GBot( ) < (pRgnB->GTop( ) +
        VERT_OVRLAP_MARGIN))
            || (pRgnB->GBot( ) < (pRgnA->GTop( ) +
            VERT_OVRLAP_MARGIN))
            || PercentOffCenter (*pRgnA, *pRgnB) <
            MAX_PERCENT_OFF_CENTER_SIDE)
    {
        return FALSE;
    }
    else
    {
        return TRUE;
    }
}
INT32 LA::PercentOffCenter (const LARgn &ROuter, const
LARgn &RInner)
const
{
    RECOMP_UNITS ExcessLeft, ExcessRight,
    InnerWidth, ExcessDiff;
    ExcessLeft = RInner.GLeft( ) - ROuter.GLeft( );
    ExcessRight = ROuter.GRight( ) - RInner.GRight( );
    InnerWidth = RInner.GWidth( );
    ExcessDiff = ABS (ExcessLeft - ExcessRight);
    return ((ExcessDiff * 100) / InnerWidth);
}
```

Subsequently, step 530, described below is executed to find credit insets. Credit Insets are typically author credits, found at the bottom of an article. For the purposes of this system, only text region insets within the spacing Parameter-D of the bottom of the page, and within the spacing Parameter-E of the left of the page are considered as possible credit insets—where "parameter-#" denotes a predetermined or programmable variable. Those are the credit insets that would be output in a fixed location. Other article credits might flow with the end of the article, and therefore would not be considered an inset.

Credit insets have less than Parameter-F lines of text, and have a ruling above them that overlaps the X-direction coordinates of the bounding box of the text region, by at least Parameter-G percent. In addition the rulings of credit insets is within Parameter-H distance of the top of the text region, its width is below Parameter-I, and the height of the text region is typically less than Parameter-J. The following code accomplishes the various calculations and analyses of the find credit insets operation using parameter values that were established empirically:

```
const RECOMP_UNITS MAX_RULE_DIST = 70;
const RECOMP_UNITS MAX_RULE_OVERLAP_DIST = 30;
const RECOMP_UNITS MAX_CREDIT_INSET_RANGE = 175;
const INT32 MIN_RULE_PRCNT_OVRLP = 90;
const INT32 MAX_RULE_PRCNT_WIDTH = 150;
const INT32 MAX_RULE_PRCNT_PAGE_WIDTH = 35;
const INT32 PERCENT_DOWN_PAGE_CREDIT_INSET = 75;
const INT32 PERCENT_RIGHT_PAGE_CREDIT_INSET = 25;
const INT32 MAX_LINES_FOR_CREDIT_INSET = 6;
const INT32 MAX_CREDIT_HEIGHT = 500;
void LA::DetectCreditInsets( )
{
    INT32 RefNum, RefNum2;
    LATextRgn *pText;
    LAHRulingRgn *pHRule;
    RECOMP_UNITS TextTop, TextBot, TextLeft, TextRight, Overlap;
    RECOMP_UNITS MinOvrlpX, MaxX;
    for (pText = RgnsL.GFirstText (RefNum);
        pText; pText = RgnsL.GNextText (RefNum))
    {
        if (pText->bCanBeSpeciat( ))
        {
            TextBot = pText->GBot( );
            if ((pText->OrderingData
                && (pText->OrderingData->GNumRgnsBelow( ) == 0))
                && (TextBot
                    > (PageData.GTopMostNonSpclText( )
```

-continued

```
                    + (((PageData.GBotMostNonSpclText( )
                        - PageData.GTopMostNonSpclText( ))
                            * PERCENT_DOWN_PAGE_CREDIT_INSET)
                        /100)))
                && (pText->GLeft( )
                    <(PageData.GLeftMostNonSpclText( )
                        + (((PageData.GRightMostNonSpclText( )
                            - PageData.GLeftMostNonSpclText( ))
                                * PERCENT_RIGHT_PAGE_CREDIT_INSET)
                            /100)))
                && (pText->GNumLines( ) <= MAX_LINES_FOR_CREDIT_INSET))
            {
                TextTop = pText->GTop( );
                TextBot = pText->GBot( );
                TextLeft = pText->GLeft( );
                TextRight = pText->GRight( );
                MinOvrlpX = ((pText->GWidth( ) * MIN_RULE_PRCNT_OVRLP) + 50)
                        /100;
                MaxX = (((TextRight - TextLeft + 1) * MAX_RULE_PRCNT_WIDTH)
                        /100);
                MAX_EQ (MaxX, ((PageData.GUsedWidth( ) *
                        MAX_RULE_PRCNT_PAGE_WIDTH)
                            /100));
                for (pHRule = RgnsL.GFirstHRuling (RefNum2);
                        pHRule; pHRule = RgnsL.GNextHRuling (RefNum2))
                {
                    if (!pHRule->GbIsPageFrameRuling( )
                        && !pHRule->GbIsNonPageFrameRuling( )
                        && ((TextTop - pHRule->GBot( )) <= MAX_RULE_DIST)
                        && (pHRule->GTop( ) <= (TextTop +
                            MAX_RULE_OVERLAP_DIST))
                        && ((TextBot - pHRule->GBot( )) <=
                            MAX_CREDIT_INSET_RANGE))
                    {
                        Overlap = (MIN (pHRule->GRight( ), TextRight)
                                - MAX (pHRule->GLeft( ), TextLeft)) + 1;
                        //for HRule, GWidth returns right - left + 1
                        if ((Overlap >= MinOvrlpX)
                            && (pHRule->GWidth( ) <= MaxX))
                        {
                            if (pText->GHeight( ) <= MAX_CREDIT_HEIGHT)
                            {
                                pText->SetTextType (InsetRegion);
                                CallSetObjectBorderFrame (plaObj, pText->GRgnId( ),
                                        TRUE, FALSE, FALSE, FALSE);
                                    set Credit Inset
                                break;
                            }
                        }
                    }
                }
            }
        }
    }
}
```

Having described in detail the operations associated with step 500, attention is now turned to the detailed explanation of the operations accomplished in step 700 for identification of center insets, column insets, and stray (or non-column) insets. In a preferred embodiment, these functions are called after recomposition operation (step 600) has identified sections, reading order, columns, and column widths (e.g., as described in U.S. patent application Ser. No. 08/652,766). However, after the inset classification functions are complete, the recomposition functions that identify reading order, columns, and column widths, are preferably rerun to treat each newly found inset in a similar manner as the recomposition function treats captions. The identification of those insets, improves the results of reading order, column determination, and column width determination.

Figure 5:
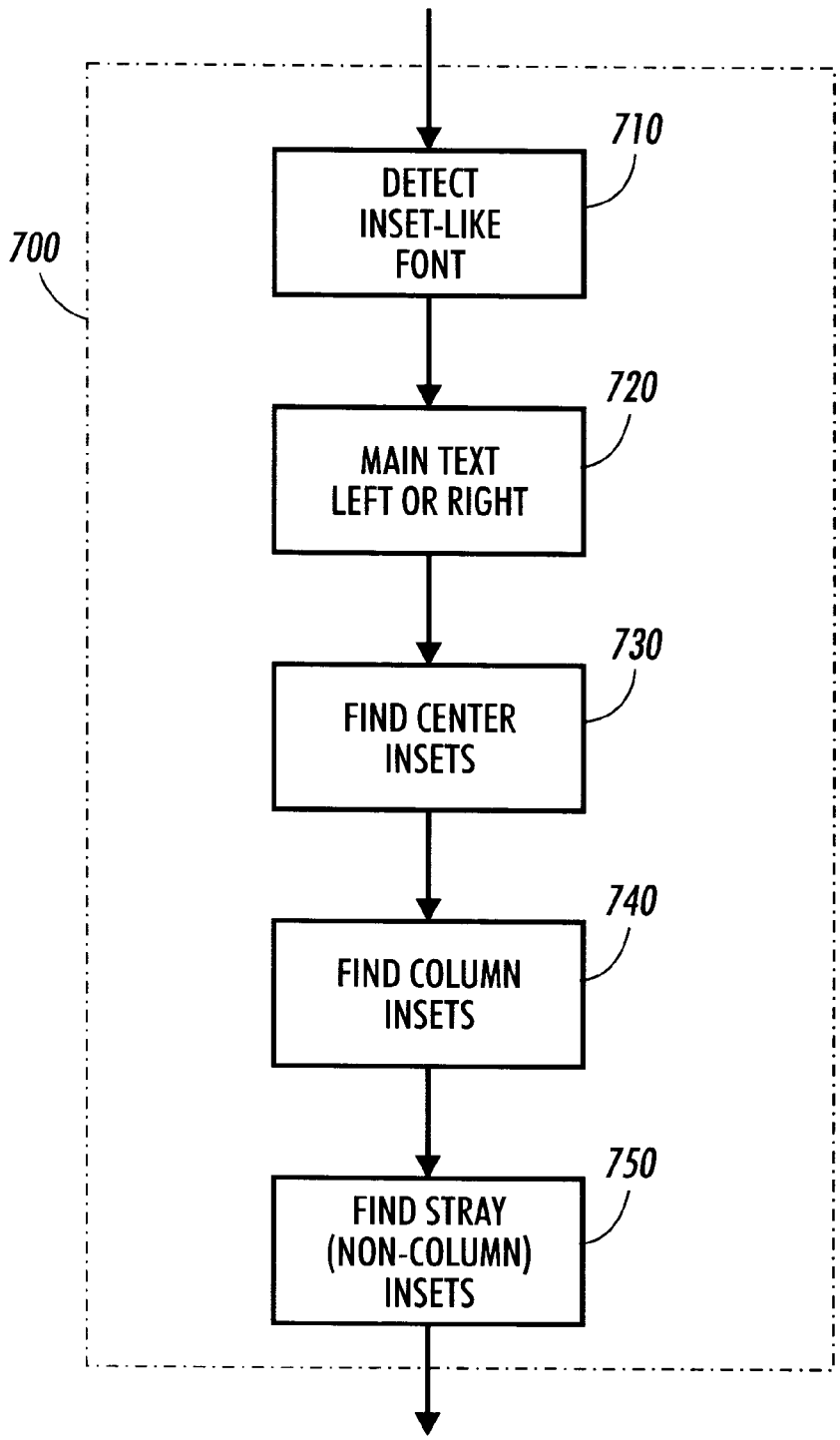

Referring to FIG. 5, in a preferred embodiment, one or more functions may be called before the inset classification steps. In particular, the function bInsetLikeFont( ), step 710, tests to determine if the text region has font and/or reverse video characteristics that are common for insets. A text region is considered to have an inset-like font if the font information of the most commonly used font in the region, has at least one of the following attributes; bold, italic, reverse video, or at least MIN_TIMES_AV_PTSIZE_FOR_INSET_SIZE=1.5, times the average font height on the page. A further discussion of font attributes can be found in U.S. Pat. No. 5,668,891, issued to Fan et al. on Sep. 16, 1997.

A second function that is preferably invoked before inset classification determines if the text region has main text to the left or right of it, step 720. The pseudocode for such a function is as follows:

for each text region on the page (called "TextA")
    if the text region is wider than 19 mm.
        MAX_TEXT_NOT_TO_SIDE_OVERLAP=1.5 mm EffectiveTop=TextA's top+MAX_TEXT_NOT_TO_SIDE_OVERLAP;
EffectiveBot=MAX (TextA's bottom—MAX_TEXT_NOT_TO_SIDE_OVERLAP, EffectiveTop);
for each other text region on the page (called "TextB")
   if the TextB's top is less than or equal to EffectiveBot and TextB's bottom is greater to or equal to EffectiveTop
   and TextB is wider than 19 mm
   then
      if TextB's left is left of TextA's left
      then TextA is considered to have main text to its left
      if TextB's right is right of TextA's righ
      then TextA is considered to have main text to its right
If a text region meeting the above conditions were found both to the left and the right of this text region, it is marked as such, so that a call to "there-is-main-text-to-the-left-and-right" for this text region would return true.

Center insets (FIG. 6) are found within columns of main text flow in step 730. In a preferred embodiment, only center insets that span more than one column are found. Although insets in the middle of a single column are often falsely identified, it is possible to find center insets entirely within a column. To be classified as a center inset a text region that is found must have the following characteristics:

- span at least two columns;
- have an inset-like font (as previously described); or
- for each text on the page that is not a header, footer, caption, or previously identified inset, if the text region is wider than 19 mm, and the text has an inset-like-font, and there is main text to the left and right, and This-Text-In-Section-Can-Be-A-Center-insect (code follows) requirements are true.

```
This-Text-In-Section-Can-Be-A-Center-Inset ( )
const INT32 MAX_CENTER_INSET_COL_OVERLAP_PERCENT = 90;
const INT32 MIN_CENTER_INSET_COL_OVERLAP_PERCENT = 15;
const INT32 MAX_CENTER_INSET_ORIG_2_COL_OVERLAP_
PERCENT = 60;
const INT32 MAX_CENTER_INSET_COL_OVRLAP_PCNT_
DIFFS = 20;
BOOL LA::bTextInSectCanBeCenterInset (const LATextRgn *pText)
//the section that pText is found, note all references to "pText", indicate a
//section of text, as found by segmentation
//where if there are less than 2 columns, the boolean returns False.
TextLeft = left edge of pText
TextRight = right edge of pText
bFoundLeftCol = FALSE
PercentLeftColOverlap = 0
PercentRightColOverlap = 0
//for each column in the section
ColLeft = the left edge of that column
ColRight = the right edge of that column
        if ((TextLeft < ColLeft) && !bFoundLeftCol)
        {//started outside of any col
            return FALSE;
        }
        if ((TextRight <= ColRight) && (TextRight >= ColLeft))
        {//text ends in this col
            if ((TextLeft >= ColLeft) && !bFoundLeftCol)
            {///in only one col
                return FALSE;
            }
            else
            {
                PercentRightColOverlap
                    = ((TextRight - ColLeft + 1) * 100)
                        /(ColRight - ColLeft + 1);
                if ((PercentRightColOverlap >
                        MAX_CENTER_INSET_COL_OVERLAP_PERCENT)
                    || (PercentRightColOverlap <
                        MIN_CENTER_INSET_COL_OVERLAP_PERCENT)
                    || (ABS (PercentRightColOverlap - PercentLeftColOverlap)
                        >MAX_CENTER_INSET_COL_OVRLAP_PCNT_DIFFS))
                {//might still end in another col also.
                    continue;
                }
                else
                {
                    return TRUE;
                }
            }
        }
        if ((TextLeft >= ColLeft) && (TextLeft <= ColRight))
        {//text starts in this col
            bFoundLeftCol = TRUE;
            PercentLeftColOverlap
                = ((ColRight - TextLeft + 1) * 100)
```

```
                    /(ColRight - ColLeft + 1);
        if ((PercentLeftColOverlap>
                MAX_CENTER_INSET_COL_OVERLAP_PERCENT)
                || (PercentLeftColOverlap <
                        MIN_CENTER_INSET_COL_OVERLAP_PERCENT))
        {
            return FALSE;
        }
    }
} //if the above function ran through each column without returning, it will
    return FALSE now.
```

And another type of center inset, with somewhat different conditions may also be found, where for each text region on the page:

```
if the text region is wider than 19 mm,
and it contains at least MIN_MULTI_COL_INSET_NUM_LINES =
2 lines of text,
and it has an inset-like-font (defined above),
and there is a text region above it, lined up with it and at least
19 mm width and there is a text region below it, lined up with
it and at least 19 mm in width,
and the-Text-In-Section-Can-Be-MultiColInset is TRUE,
then it is classified as a center inset. The following s the code for
the Text-In-Section-Can-Be-MultiColInset ( ).
const RECOMP_UNITS MULTI_COL_RANGE_MARGIN = 25;
BOOL LA::bTextInSectCanBeMultiColInset (const LATextRgn *pText)
//the section that pText is found, note all references to "pText", indicate a
//section of text, as found by segmentation
//if there are less than 2 columns, return False.
TextLeft = left edge of pText
TextRight = right edge of pText
bFoundLeftCol = FALSE
//for each column in the section
ColLeft = the left edge of that column
ColRight = the right edge of that column
    if (((TextLeft + MULTI_COL_RANGE_MARGIN) < ColLeft)
            && !bFoundLeftCol)
    { //started outside of any col
            return FALSE;
    }
    if (TextRight <= (Col Right + MULTI_COL_RANGE_MARGIN))
    { //text ends in this col
        if ((TextLeft >= ColLeft) && !bFoundLeftCol)
        { //in only one col
            return FALSE;
        }
        else
        {
            if (!bColumnTextAboveAndBelow (pText))
            {
                return FALSE;
            }
            return TRUE;
        }
    }
    if ((TextLeft <= (ColLeft + MULTI_COL_RANGE_MARGIN))
            && ((TextLeft + MULTI_COL_RANGE_MARGIN) >=
            ColLeft))
    { //text starts in this col
        bFoundLeftCol = TRUE
    }
} //if it ran through each column without returning, it will return
FALSE now
``` where bColumnTextAboveAndBelow (pText) does the following:

```
const RECOMP_UNITS MAX_COL_TO_INSET_RANGE =
200;
const INT32 MIN_LINES_FOR_COL = 6;
const INT32 MAX_PERCENT_OF_INSET_WIDTH_IS_COL =
90;
BOOL LA::bColumnTextAboveAndBelow (const LATextRgn
    *pText)
{
/* end C++ code */
BOOL bFoundCol = FALSE;
if there is a text region above it, lined up with it, and at least 19 mm
    in width, and there is a text region below it, lined up with it of
    at least 19 mm in width,
then MaxColWidth = ((pText's width * MAX_PERCENT_OF_
    INSET_WIDTH_IS_COL) /100);
```

Since the inset for a multi column case, even if just the 1-1 col type, has to be wider than the columns above and below it:

```
for each test region, TextB, immediately below pText
if TextB is wider than 19 mm
    and TextB has at least MIN_LINES_FOR_COL)
    and TextB is narrower or equal to MaxColWidth
    and (TextB's top - pText's bottom) <= MAX_COL_TO_
    INSET_RANGE))
then
    bFoundCol = TRUE;
    break;
else
    continue
if, after checking each TextB bFoundCol is still False
then return FALSE;
bFoundCol = FALSE;
pTextUpperRight = NIL;
for each text region, TextB, immediately above pText
if TextB is wider than 19 mm
    and TextB has at least MIN_LINES_FOR_COL)
    and TextB is narrower or equal to MaxColWidth
    and (pText's top - TextB's bottom) <= MAX_COL_TO_
    INSET_RANGE))
    and there is no ruling between pText and TextB
then
    if ((!p TextUpperRight)
        || (pTextB->GRight( ) > pTextUpperRight-> GRight( )))
    {
        pTextUpperRight = pTextB;
    }
    bFoundCol= TRUE;
if, after checking each TextB bFoundCol is still False
then return FALSE;
else
    if (pTextUpperRight->GIsTextContinues( ) == False)
    {
        //Ruled out inset (might not be anyway)
        //since upper right text doesn't continue
        return FALSE;
    }
    return TRUE;
}
``` the function pTextUpperRight->GIsTextContinues( ) checks whether a particular text region is likely to have ended in a hard return (in which case it returns FALSE), or whether it likely continues somewhere else on the page (in which case it returns TRUE)

In further identifying the center insets, the following operations may be employed (and may also be used in the recomposition operations previously described. Additional data is collected as follows:

Rights is an array of the distance from the beginning of the page to the end of each line in the text region;
Lefts is an array of the distance from the beginning of the page to the beginning of each line in the text region;
NumLines is the number of text lines in the text region;
AvLeft is the mean of all the Lefts for this text region; and
AvRight is the mean of all the Rights for this text region.

```
const INT32 MIN_PERCENT_LINE_WIDTH_TO_CONTINUE = 94;
// Now determine if last line continues on same page.
if ((Rights[NumLines - 1] - Lefts[NumLines - 1] + 1)
        < (((AvRight - AvLeft + 1)
            * MIN_PERCENT_LINE_WIDTH_TO_CONTINUE)
            /100))
{
    SetTextContinues (False);
}
else
{
    SetTextContinues (True);
}
```

It will be appreciated that additional "rules" may be employed to improve or alter the robustness of the identification algorithm presented herein. For example, the step of finding center insets (730) may also include additional steps such as: (i) determining whether the text region 730r has columnar text regions 730a, 730b or 730c positioned to at least one side thereof; (ii) determining whether the text region 730r spans at least two columns 730a–730c; (iii) determining whether a width dimension (730w) of the text region is greater than a predefined width (I); (iv) identifying a left-hand column 730a where a left edge of the text region is located, then determining the portion of the left-hand column's width (732) that the text region comprises and determining that the text region is a center inset whenever the portion is greater than a predetermined value (A) and less than a second predetermined value (B); (v) identifying a right-hand column where a right edge of the text region is located, then determining the portion of the right-hand column's width (734) that the text region comprises and determining that the text region is a center inset whenever the portion is greater than the predetermined value (A) and less than the predetermined value (B); (vi) determining that a column portion difference value, representing the difference between the portion of the left-hand column's width and the portion of the right-hand column's width, is less than a predetermined value (C); determining whether the text region has a number of text lines at least equal to a predetermined value (F); (vii) determining whether there is another text region above and vertically aligned with said text region, and having a width greater than the predefined width (I); (viii) determining whether there is another text region below and vertically aligned with said text region, and having a width greater than the predefined width (I); (ix) determining whether there is a first column having a left edge, and whether a left edge of said text region is located within a predetermined distance ($D_1$) of the left edge of the first column; (x) determining whether there is a second column having a right edge, and whether a right edge of said text region is located within a predetermined distance ($D_2$) of the right edge of the second column; (xi) determining whether there is columnar text above and below the text region, wherein the columnar text regions above and below the text region are each lined up with the text region, and where each columnar text region includes at least a predetermined number of lines (G), and each columnar text region has a width that is less than a predetermined percentage (H) of the width of the text region, and wherein each columnar text region is closer than a predetermined value vertical distance (I) from the text region; or (xii) determining that a text region immediately above the text region, is likely to continue on the same page.

The process of determining if a columnar text region interrupted by a center inset (e.g., region 730b) is likely to continue on the same page would preferably include the steps of (a) determining the width of the last line of the text region above (736), (b) determining the width of the average line of that text region (also equal to 736 in FIG. 7, but not necessarily so), and determining that it is unlikely to continue when the width of the last line is less than a predetermined percentage (K) of the width of the average line of that text region.

After finding center insets, the find column insets process is initiated at step 740, where columns off to one side of the main text flow (e.g., inset 742 in FIG. 8) are identified. In a preferred embodiment, only the leftmost, and rightmost columns within a section are considered to be possible column insets as consideration of other columns would likely lead to a higher incidence of false identification as a column inset. Thus, there must be at least two, and preferably at least three columns in order for a section of the image to have a column inset. Leftmost and rightmost columns are considered to be column insets if they meet column width requirements. For purposes of explanation tests will be characterized for either a leftmost or rightmost column, but one skilled in the art of page layout analysis will appreciate that the tests may be applied to either the leftmost and/or rightmost columns of a page section. In one test, if the leftmost or rightmost columns are less than Parameter-O percent the width of the average of the other columns, and have less than Parameter-P percent of the number of lines that the average of the other columns do it may be a column inset. Furthermore, Parameter-O and Parameter-P are preferably different if the column has an inset-like font.

Where const INT32 MIN_COLS_FOR_COL_INSET= 3; for each section on the page, the following operations are executed:

```
/* Column Insets are only detected for sections that have at least
MIN_COLS_FOR_COL_INSET columns,
    as found by the recomposition operation */
    FirstColWid = 0
    SecondColWid = 0
    PenultimateColWid = 0
    LastColWid = 0
    LastColNumLines = 0
    bFirstColBoldItRev = FALSE
    bLastColBoldItRev = FALSE
    AvRightColWidths = 0
    AvLeftColWidths = 0
    AvRightColNumLines = 0
    AvLeftColNumLines = 0
    for each column in section
        ColLeft is the column left edge
```

-continued

```
        ColRight is the column right edge
        ColWidth is the column width
        if this is the first column in the section
        then
            FirstColWid = ColWidth;
            FirstColNumLines = the number of lines in this column
            bFirstColBoldItRev = TRUE if this column's most common
                    font is Bold, Italic, or if it is in Reverse video
        else
            AvRightColWidths += ColWidth;
            AvRightColNumLines += number of lines in this column
        if this is the second column in the section
        then
            SecondColWid = ColWidth;
            SecondColNumLines = number of lines in this column
        if this is the second to last column in this section
        then
            PenultimateColWid = ColWidth;
            PenultimateColNumLines = number of lines in this column
        if this is the last column in the section
            LastColWid = ColWidth;
            LastColNumLines = number of lines in this column
            bLastColBoldItRev = TRUE if this column's most common
                    font is Bold, Italic, or if it is in Reverse video
        if this is not the last column in the section
            AvLeftColWidths += ColWidth;
            AvLeftColNumLines += number of lines in this column
    // now all the columns have been checked
        AvLeftColWidths /= (NumCols − 1);
        AvRightColWidths /= (NumCols − 1);
        AvLeftColNumLines /= (NumCols − 1);
        AvRightColNumLines /= (NumCols − 1);
    // now check if the first column is an inset
        ThisColWid = FirstColWid
        NextColWid = SecondColWid
        OppositeColWid = LastColWid
        AvColWid = AvRightColWidths
        ThisColNumLines = FirstColNumLines
        NextColNumLines = SecondColNumLines
        AvColNumLines = AvRightColNumLines
        bThisBoldItRev = bFirstColBoldItRev
``` as specifically represented by the function bIsColInset below:

```
const INT32 MAX_BIR_PERCENT_INSET_COL_WID = 75;
const INT32 MAX_BIR_PERCENT_INSET_NUM_LINES = 65;
const INT32 MAX_PERCENT_INSET_COL_WID = 65;
const INT32 MAX_PERCENT_INSET_NUM_LINES = 30;
    if ((bThisBoldItRev
        && ((ThisColWid < MIN (NextColWid, OppositeColWid))
            && ((ThisColWid * 100)
                < (MIN (AvColWid, NextColWid)
                    * MAX_BIR_PERCENT_INSET_COL_WID))
            && ((ThisColNumLines * 100)
                < (MIN (AvColNumLines, NextColNumLines)
                    * MAX_BIR_PERCENT_INSET_NUM_LINES))))
        || (!bThisBoldItRev
        && ((ThisColWid < MIN (NextColWid, OppositeColWid))
            && ((ThisColWid * 100)
                < (MIN (AvColWid, NextColWid)
                    * MAX_PERCENT_INSET_COL_WID))
            && ((ThisColNumLines * 100)
                < (MIN (AvColNumLines, NextColNumLines)
```

-continued

```
                    * MAX_PERCENT_INSET_NUM_LINES)))))
    {
        return TRUE;
    }
```

Next, bIsColInset is called again for the last column, with the following values, to determine any insets are present within the column:

ThisColWid=LastColWid
NextColWid=PenultimateColWid
OppositeColWid=FirstColWid
AvColWid=AvLeftColWidths
ThisColNumLines=LastColNumLines
NextColNumLines=PenultimateColNumLines
AvColNumLines=AvLeftColNumLines
bThisBoldItRev =bLastColBoldItRev It will be appreciated by those skilled in the art of document analysis that various modifications and alterations to the above-described identification techniques may be employed based upon empirical knowledge about the documents. For example, as with any of the parameter-based tests, it is possible to utilize a programmable variable for the parameter so that one could simply alter the parameter value to obtain improved performance. It is also contemplated that the programmable may be adjusted automatically by the system after an analysis of a plurality of "test" (exemplary) documents so as to determine typical parameter values.

Lastly, stray or non-column insets are detected at step 750. It may be preferable to perform a page recomposition operation before initiating the stray inset detection operation, because stray insets are other bits of text, not properly part of the text flow and not previously identified as an inset. If the rules that determined columns, did not include a column where the stray inset texts are, they are considered to be stray insets. Furthermore, stray insets must be Parameter-Q distance outside of the outermost column if they do not have an inset-like font, or their midpoint can be within Parameter-R (which may be a positive or negative value) of the column end if they do have an inset-Like font. The width of a stray inset, multiplied by Parameter-S, must be less than the width of the columns of the closest section. To identify stray insets, for each section on the page:

```
const INT32 MAX_LINES_FOR_OTHER_NON_COL_TEXT = 4;
const
RECOMP_UNITS MAX_CENTER_OVERLAP_SIDE_INSET = 120;
const
INT32 MAX_NON_COL_INSET_PERCENT_WITHIN_COL = 80;
const
INT32 MAX_SIDE_INSET_WIDTH_PERCENT_OF_COLS = 80;
ColsLeft = start of first column for this section
ColsRight = end of last column of this section
``` for each text region in this section that meets this condition

```
((TextWidth * 100)
    <= ((ColsRight − ColsLeft + 1)
        * MAX_SIDE_INSET_WIDTH_PERCENT_OF_COLS))
    if ((!pText->GFullColWidth( ))
        && ((pText->GRight( ) < ColsLeft)
```

```
                || (pText->GLeft( ) > ColsRight)))
    {
        pText->SetTextType (InsetRegion);
    }
    else if ((!pText->GFullColWidth( )
                || pText->GNumLines( )
                    <= MAX_LINES_FOR_OTHER_NON_COL_TEXT)
            && (((pText->AverageOfLeftAndRightEdges( )
                    < (ColsLeft + MAX_CENTER_OVERLAP_SIDE_INSET))
                    && (((pText->GRight( ) - ColsLeft + 1) * 100)
                        <= (TextWidth
                            * MAX_NON_COL_INSET_PERCENT_WITHIN_COL)))
                || ((pText->AverageOfLeftAnd RightEdges( )
                        >= (ColsRight - MAX_CENTER_OVERLAP_SIDE_INSET))
                    && (((ColsRight - pText->GLeft( ) + 1) * 100)
                        <= (TextWidth
                            * MAX_NON_COL_INSET_PERCENT_WITHIN_COL))))
            && (pText->bInsetLikeFont (PageData.GAvFontPtSizeTimes5( ))))
    {
        pText->SetTextType (InsetRegion);
    }
``` where pText->GFullColWidth( ) is true if pText is wider than 19 mm, and pText->GNumLines( ) is the number of lines of text in pText.

```
const INT32 MAX_LINES_FOR_OTHER_NON_COL_TEXT = 4;
const RECOMP_UNITS MAX_CENTER_OVERLAP_SIDE_INSET = 120;
const INT32 MAX_NON_COL_INSET_PERCENT_WITHIN_COL = 80;
const INT32 MAX_SIDE_INSET_WIDTH_PERCENT_OF_COLS = 80;
BOOL LA::FindStrayInsets (const LASect * const pSect,
                          const INT32 SectNum,
                          const INT32 * const pColDimsPairs)
{
    BOOL rValue = FALSE;
    INT32 RefNum;
    LATextRgn *pText;
    RECOMP_UNITS ColsLeft = pColDimsPairs[0];
    RECOMP_UNITS ColsRight, TextWidth, TextSumX;
    if (pSect->GNumCols( ) < 1)
    {
        return rValue;
    }
    ColsRight = pColDimsPairs[(pSect->GNumCols( ) * 2) - 1];
    for (pText = RgnsL.GFirstText (RefNum);
            pText; pText = RgnsL.GNextText (RefNum))
    {
        TextWidth = pText->GWidth( );
        if ((!pText->bCanBeSpecial( ))
                || !(pText->GSectNum( ) == SectNum)
                || ((TextWidth * 100)
                    > ((ColsRight - ColsLeft + 1)
                        * MAX_SIDE_INSET_WIDTH_PERCENT_OF_COLS)))
        {
            continue;
        }
        TextSumX = pText->GSumX( );
        if ((!pText->GFullColWidth( ))
                && ((pText->GRight( ) < ColsLeft)
                    || (pText->GLeft( ) > ColsRight)))
        {
            pText->SetTextType (InsetRegion);
            rValue = TRUE;
        }
        else if ((!pText->GFullColWidth( )
                    || pText->GNumLines( )
                        <= MAX_LINES_FOR_OTHER_NON_COL_TEXT)
                && ((((TextSumX / 2)
                        < (ColsLeft + MAX_CENTER_OVERLAP_SIDE_INSET))
                        && (((pText->GRight( ) - ColsLeft + 1) * 100)
                            <= (TextWidth
                                * MAX_NON_COL_INSET_PERCENT_WITHIN_COL)))
                    || (((TextSumX / 2)
```

```
                      >= (ColsRight - MAX_CENTER_OVERLAP_SIDE_INSET))
                  && (((ColsRight - pText->GLeft( ) + 1) * 100)
                    <= (TextWidth
                         * MAX_NON_COL_INSET_PERCENT_WITHIN_COL))))
               && (pText->bInsetLikeFont (PageData.GAvFontPtSizeTimes5( ))))
      {
         pText->SetTextType (InsetRegion);
         rValue = TRUE;
      }
   }
   return rValue;
}
```

Practically, the "rules" employed in the stray inset determination operations may include one or more of the following: (a) less than a predetermined number of lines (e.g., 5 lines); (b) determining a distance from a left edge of a leftmost column in a text region to a right edge of a rightmost column in the text region, wherein the text region is a part of document having columnar regions, and identifying as a stray inset a the text region having a width less than a predetermined percentage (S) of the distance; (c) determining whether the width of the text region is narrower than a predefined width (I); (d) determining whether a portion of the text region lies outside of a columnar space defined by the outermost edges of outermost columns within a section of the document; (e) whenever a portion of the text region lies within the columnar space, determining if the text region has less than a predetermined number of lines (T), and if so, characterizing the text region as a stray inset; or (f) whenever a portion of the text region lies within the columnar space, determining that the width of the text region is less than a predetermined fraction of the width of the columnar space.

It is, therefore, apparent that there has been provided, in accordance with the present invention, a method and apparatus for page layout analysis, including a method for detecting and classifying insets within various portions of a document page. It will be appreciated by those skilled in the art that various implementations and modifications to the above-described embodiment may be accomplished to meet the requirements of alternative embodiments. Such natural extensions or modifications of the method described herein for inset identification are included within the spirit and scope of the of the invention as defined by the appended claims.

I claim:

1. A document layout analysis method for determining document structure data from input data including the content and characteristics of regions of a portion of at least one page forming the document, the method comprising the steps of:

segmenting the regions within the page to identify regions characterized as text and graphics;

analyzing text regions to identify and characterize certain text regions as insets comprising the steps of:
     a) finding a pair of horizontal rulings in general vertical alignment with one another; and
     b) identifying text present between said horizontal rulings;

producing an output of the recomposed text regions of the image in reading order, wherein the reading order is a function of the column boundaries; and performing optical character recognition on the text regions.

2. The method of claim 1, wherein the step of analyzing text regions to identify and characterize certain text regions as insets further comprises at least one of the following steps:

determining whether the text region consists essentially of an inset-like font;

finding frame insets;

finding credit insets;

finding center insets;

finding column insets; and finding stray (non-column) insets.

3. The method of claim 1, wherein the step of finding frame insets further comprises the steps of:

for each horizontal ruling, find a right connecting lower vertical ruling,
     then finding a connecting bottom-left horizontal ruling, and if found
     finding a connecting left top vertical ruling; and identifying as a frame inset any text completely surrounded on the top, bottom, left and right by rulings.

4. The method of claim 2, wherein the step of finding credit insets further comprises the step of executing at least one of a group of credit inset determining steps consisting of:

determining whether a text region is within a predefined spacing (D) of the bottom of the page;

determining whether the text region is within a predefined spacing (E) of the left of the page;

determining whether the text region has less than a predefined number of lines of text;

determining whether the text region has a ruling above that overlaps a horizontal-direction coordinates of a bounding box surrounding the text region by at least a predefined percent of the horizontal width of the text region;

determining whether any associated rulings surrounding the text region are within a predefined spacing (H) from the top of the text region and have a width less than predefined width (I); and determining whether the height of the text region is less than a predefined height (J).

5. The method of claim 2, wherein the step of finding center insets further comprises at least one of the steps from the group including:

determining whether the text region has columnar text adjacent to at least one side thereof;

determining whether the text region spans at least two columns;

determining whether a width of the text region is greater than a predefined width (I);

identifying a left-hand column where a left edge of the text region is located, then determining a first portion of the left-hand column's width that the text region comprises and determining that the text region is a center inset whenever the first portion is greater than a predetermined value (A) and less than a second predetermined value (B);

identifying a right-hand column where a right edge of the text region is located, then determining a second portion of the right-hand column's width that the text region comprises and determining that the text region is a center inset whenever the second portion is greater than the predetermined value (A) and less than the predetermined value (B); and determining that a column portion difference value, representing the difference between the first portion of the left-hand column's width and the second portion of the right-hand column's width, is less than a predetermined value (C).

6. The method of claim 2, wherein the step of finding center insets further comprises at least one of the steps from the group including:

determining if the width of the text region is greater than the predefined width (I);

determining whether the text region has a number of text lines at least equal to a predetermined value (F);

determining whether there is another text region above and vertically aligned with said text region, and having a width greater than the predefined width (I);

determining whether there is another text region below and vertically aligned with said text region, and having a width greater than the predefined width (I);

determining whether there is a first column having a left edge, and whether a left edge of said text region is located within a predetermined distance (D) of the left edge of the first column;

determining whether there is a second column having a right edge, and whether a right edge of said text region is located within a predetermined distance (D) of the right edge of the second column;

determining whether there is columnar text above and below the text region, wherein the columnar text regions above and below the text region are each lined up with the text region, and where each columnar text region includes at least a predetermined number of lines (G), and each columnar text region has a width that is less than a predetermined percentage (H) of the width of the text region, and wherein each columnar text region is closer than a predetermined value vertical distance (I) from the text region; and determining that a text region immediately above the text region, is likely to continue on the same page.

7. The method of claim 6, wherein the step of determining if a text region is likely to continue on the same page further comprises the steps of:

determining the width of the last line of the text region;

determining the width of the average line of that text region; and determining that it is unlikely to continue whenever the width of the last line is less than a predetermined percentage (K) of the width of the average line of that text region.

8. The method of claim 1, wherein the step of finding column insets further comprises at least one of the steps of the group comprising:

determining whether the text region has at least a predetermined number of columns (R);

setting a predetermined percentage (L) equal to a predetermined value (M) if the text region within a section has an inset-like font, otherwise setting the predetermined percentage (L) equal to a predetermined value (N), where M and N are not equal, and then determining whether the text region has a width less than the predetermined percentage (L) of the width of an average width of other columns in the section;

setting a predetermined percentage (O) equal to a predetermined value (P) if the text region within a section has an inset-like font, otherwise setting the predetermined percentage (O) equal to a predetermined value (Q), where P and Q are not equal, and then determining whether the text region has a number of lines less than value (O) percent of an average number of lines of the other columns in the section.

9. The method of claim 8 wherein R is an integer greater than 1.

10. The method of claim 1, wherein the step of finding stray insets further comprises at least one of the steps selected from the group consisting of:

determining a distance from a left edge of a leftmost column in a text region to a right edge of a rightmost column in the text region, wherein the text region is a part of document having columnar regions, and identifying as a stray inset a the text region having a width less than a predetermined percentage (S) of the distance;

determining whether the width of the text region is narrower than a predefined width (I);

determining whether a portion of the text region lies outside of a columnar space defined by the outermost edges of outermost columns within a section of the document;

whenever a portion of the text region lies within the columnar space, determining if the text region has less than a predetermined number of lines (T), and if so, characterizing the text region as a stray inset; and whenever a portion of the text region lies within the columnar space, determining that the width of the text region is less than a predetermined fraction of the width of the columnar space.

11. The method of claim 10, wherein the step of determining whether a portion of the text region lies outside of a columnar space defined by an outer edge of an outermost column requires that the portion of the text region is 100 percent.

12. The method of claim 11, wherein the step of determining whether a portion of the text region lies outside of a columnar space defined by an outer edge of an outermost column further includes the step of determining that an innermost edge of the text region is spaced apart horizontally from the outermost edge of the outermost column.

13. The method of claim 2, wherein the step of determining whether the text region consists essentially of an inset-like font further comprises the steps of:

determining the most common font attributes used in the text region; and determining if the most common font has at least one attribute selected from the group of attributes consisting of bold, italic, reverse video, having a font height at least equal to a predetermined percentage (Z) of the height of an average font on the page.

14. The method of claim 4 wherein the step of analyzing text regions to identify and characterize certain text regions as insets further includes the step of applying a different weighting factor to each of a plurality of credit inset determining steps within the group.

15. The method of claim 5 wherein the step of analyzing text regions to identify and characterize certain text regions as center insets further includes the step of applying a different weighting factor to each of a plurality of inset identification steps within the group.

16. The method of claim 6 wherein the step of analyzing text regions to identify and characterize certain text regions as center insets further includes the step of applying a different weighting factor to each of a plurality of inset identification steps within the group.

17. The method of claim 8 wherein the step of analyzing text regions to identify and characterize certain text regions as column insets further includes the step of applying a different weighting factor to each of a plurality of inset identification steps within the group.

18. The method of claim 10 wherein the step of analyzing text regions to identify and characterize certain text regions as stray insets further includes the step of applying a different weighting factor to each of a plurality of inset identification steps within the group.

19. The method of claims 4 wherein at least one of a plurality of predetermined values is a programmable variable that is set at a value as a function of the type of document to processed.

20. The method of claim 19, wherein the value of the programmable variable and the associated type of document to be processed is determined in a training step that includes analyzing a plurality of similarly structured test documents.

21. The method of claim 11, wherein the step of identifying those remaining text regions that are frame and credit insets comprises the steps of:

analyzing rulings within the page, further including the steps of
      analyzing full frames to identify characteristics of any full frames, and
      locating pictures and text in the full frames and identifying locations thereof;
   after locating the pictures and text in the full frames, locating any frame insets associated with the full frame based upon the characteristics of the full frame; and
   then locating any credit insets associated with the pictures.

22. A document layout analysis method for determining document structure data from input data including the content and characteristics of regions of at least one page forming the document, the method comprising the steps of:

receiving page data;
   segmenting the regions within the page to identify regions characterized as text, graphics, and rulings;
   within the text regions, identifying those text regions representing headers footers and captions and for the remaining text regions,
      identifying those remaining text regions that are frame and credit insets,
      recomposing the text regions of the document,
      identifying, within the recomposed text, any center, column and stray insets; and
   recalculating the sections of the document so as to produce output data indicative of the reading order of text regions therein.

23. The method of claim 1, further comprising the steps of:

identifying, within the text regions, those text regions representing headers footers and captions, and for the remaining text regions not identified as representing headers footers and captions,
   recomposing the text regions of the document;
   combining the text regions into columns; and
   determining boundaries of at least one column on the page.

24. The method of claim 6, wherein the step of determining if a text region is likely to continue on the same page further comprises the steps of:

determining the width of the last line of the text region;
   determining the width of a representative line of that text region; and
   determining that it is unlikely to continue whenever the width of the last line is less than a predetermined percentage (K) of the width of the average line of that text region.

25. The method of claim 24, wherein the representative line is characterized as having a line width equal to the average line width of lines in the text region.

* * * * *